(12) United States Patent
Nakata et al.

(10) Patent No.: US 6,747,696 B1
(45) Date of Patent: Jun. 8, 2004

(54) CAMERA CAPABLE OF CANCELING NOISE IN IMAGE DATA AND SIGNAL PROCESSING METHOD THEREOF

(75) Inventors: Hiroyuki Nakata, Tokyo (JP); Noriysau Murata, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/532,817

(22) Filed: Mar. 21, 2000

(30) Foreign Application Priority Data

Mar. 26, 1999 (JP) .......................................... 11-082767

(51) Int. Cl.[7] .............................. H04N 9/64; H04N 5/202
(52) U.S. Cl. ........................................ 348/243; 348/254
(58) Field of Search ............................ 348/207.99, 241, 348/243, 244, 248, 254, 255, 256; 358/482, 483, 513, 518, 519

(56) References Cited

U.S. PATENT DOCUMENTS

| | | | | |
|---|---|---|---|---|
| 5,053,873 A | * | 10/1991 | Taniji | 348/243 |
| 5,406,391 A | * | 4/1995 | Takahashi | 358/482 |
| 5,589,954 A | * | 12/1996 | Watanabe | 358/518 |
| 5,943,094 A | * | 8/1999 | Sakai et al. | 348/243 |
| 2002/0012053 A1 | * | 1/2002 | Yoshida | 348/243 |

FOREIGN PATENT DOCUMENTS

| | | |
|---|---|---|
| JP | 4-170876 | 6/1992 |
| JP | 6-253217 | 9/1994 |
| JP | 8-51571 | 2/1996 |
| JP | 8-251484 | 9/1996 |
| JP | 8-307775 | 11/1996 |
| JP | 9-181977 | 7/1997 |
| JP | 11-112884 | 4/1999 |

* cited by examiner

*Primary Examiner*—Tuan Ho
(74) *Attorney, Agent, or Firm*—Frishauf, Holtz, Goodman & Chick, P.C.

(57) ABSTRACT

In a camera having a gamma-correction circuit on an output signal processing path of a CCD, an incident light path leading to the CCD is kept opening in a state where nonlinear gamma-correction processing in the gamma-correction processing circuit is prohibited, first image data (CCD output data; DATA1) are generated based on electric signal output from the CCD, incident light path leading to the CCD is kept closing, second image data (CCD output data; DATA2) are generated based on electric signal output from the CCD and lastly, the second image data DATA2 are subtracted from the first image data DATA1, thereby correcting to eliminate dark voltage component included in the first image data DATA1.

19 Claims, 13 Drawing Sheets

OPENING AND CLOSING
STATES OF MECHANICAL SHUTTER

OPENING AND CLOSING
STATES OF MECHANICAL SHUTTER

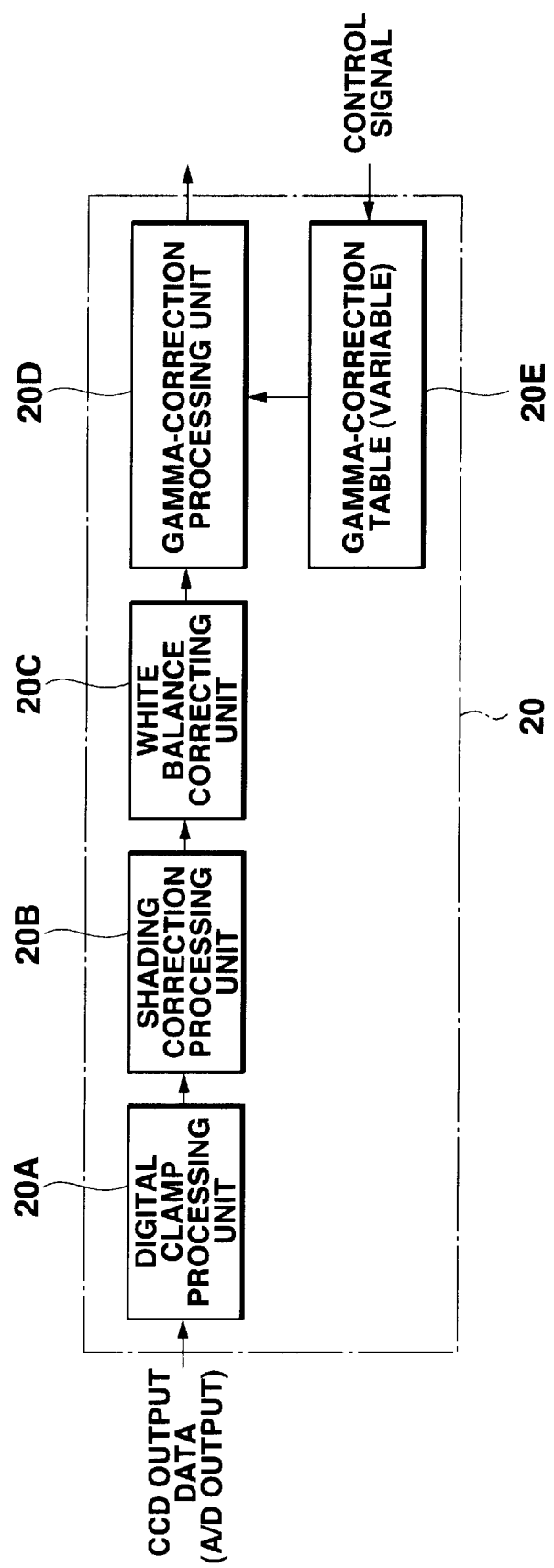

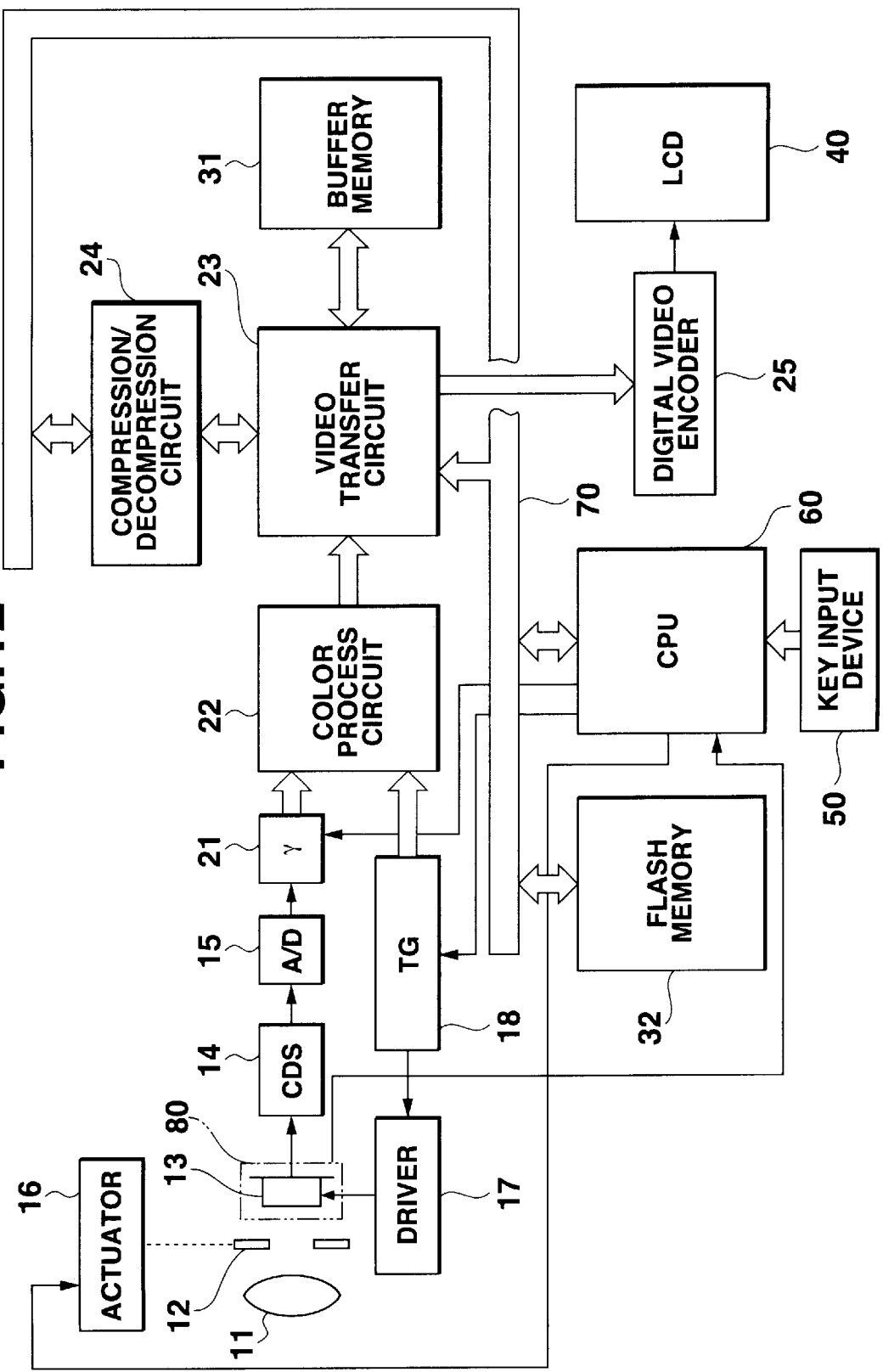

CAMERA CAPABLE OF CANCELING NOISE IN IMAGE DATA AND SIGNAL PROCESSING METHOD THEREOF

CROSS-REFERENCE TO RELATED APPLICATIONS

This application is based upon and claims the benefit of priority from the prior Japanese Patent Application No. 11-082767, filed Mar. 26, 1999, the entire contents of which are incorporated herein by reference.

BACKGROUND OF THE INVENTION

The present invention relates to a camera and a signal processing method thereof. More particularly, the present invention relates to a camera for canceling a dark signal component resulted from an image pick-up device such as a CCD (Charge Coupled Device), and relates to a signal processing method of the camera.

In recent years, mobile tools such as electronic still cameras and notebook personal computers have become widespread as the development of the semiconductor technology has surged forward. Especially, the electronic still camera picks up an image of a subject incident through an objective lens to generate electric signals by using an image sensor, and based on the electric signals displays the image on a liquid crystal display, or stores the image data in a nonvolatile semiconductor memory card. Further, the image data can be captured into a personal computer and subjected to an image processing. Therefore, the electronic still cameras have become widespread rapidly.

Meanwhile, it is known that the CCD which is mounted in the above-described electronic still camera has so-called dark output (dark voltage) characteristics in which output voltage is generated even when incident light is intercepted, and with this dark output, a very small current called dark current is generated.

This dark voltage in the CCD has temperature dependence in which dark voltage is approximately doubled if environmental temperature is varied (increased) about 8° C. The dark voltage has the exposure time (electric charge accumulation period) dependence indicative of tendency that the dark voltage is increased as the exposure time is longer under the same temperature condition.

The dark voltage of the CCD becomes noise component and as a result, this is the factor that affects the image data and deteriorates image quality.

As one of techniques for solving this problem, there is a known technique in which image data (dark output component) generated when a mechanical shutter is closed is subtracted from image data (subject image data including dark output component) generated when the mechanical shutter is opened, thereby canceling the noise component from the image data.

However, according to this technique, there is a problem that if the subtraction is carried out using image data which have been subjected to gamma-correction processing having nonlinear characteristics or saturated image data, or if the subtraction is carried out even when the level of the dark output component is low, excellent image data can not be obtained.

BRIEF SUMMARY OF THE INVENTION

Accordingly, it is an object of the present invention to provide a camera capable of carrying out a correcting processing for canceling noise component from image data without deteriorating image quality so as to obtain excellent image data.

According to the present invention, there is provided a camera comprises image pick-up means (an image sensor) for outputting image data in accordance with incident light, first pick-up control means for obtaining first image data output from the image pick-up means under a condition where an incident light path of the image pick-up means is opened, second pick-up control means for obtaining second image data output from the image pick-up means under a condition where the incident light path of the image pick-up means is closed, means for correcting the first image data obtained by the first pick-up control means based on the second image data obtained by the second pick-up control means, nonlinear processing means (a gamma correcting circuit) for subjecting the image data output from the image pick-up means to nonlinear processing, and means for prohibiting the nonlinear processing for the image data by the nonlinear processing means when the first and second image data are obtained by the first and second pick-up control means.

With this structure, the first and second pick-up control means can obtain the first and second image data which are not subjected to the nonlinear processing by the nonlinear processing means. With this feature, it is possible to provide a camera capable of carrying out the correction processing for canceling the noise component from the image data without deteriorating the image quality, and capable of obtaining excellent image data.

According to the present invention, there is provided another camera comprises image pick-up means (an image sensor) for outputting image data in accordance with incident light, first pick-up control means for obtaining first image data output from the image pick-up means under a condition where an incident light path of the image pick-up means is opened, second pick-up control means for obtaining second image data output from the image pick-up means under a condition where the incident light path of the image pick-up means is closed, means for determining whether an isolation point is included in the second image data obtained by the second pick-up control means, and means for correcting the first image data obtained by the first pick-up control means based on a result of the determination made by the determining means.

With this feature, it is possible to provide a camera capable of carrying out the correction processing for canceling the noise component from the image data without deteriorating the image quality, and capable of obtaining excellent image data.

According to the present invention, there is provided a further camera comprises image pick-up means (an image sensor) for outputting image data in accordance with incident light, first pick-up control means for obtaining first image data output from the image pick-up means under a condition where an incident light path of the image pick-up means is opened, second pick-up control means for obtaining second image data output from the image pick-up means under a condition where the incident light path of the image pick-up means is closed, means for determining whether a level of the first image data obtained by the first pick-up control means is saturated, and means for correcting the first image data obtained by the first pick-up control means based on a result of determination made by the determining means and based on the second image data obtained by the second pick-up control means.

With this feature, it is possible to provide a camera capable of carrying out the correction processing for canceling the noise component from the image data without deteriorating the image quality, and capable of obtaining excellent image data.

According to the present invention, there is provided a still another camera comprising image pick-up means (an image sensor) for outputting image data in accordance with incident light, first pick-up control means for obtaining first image data output from the image pick-up means under a condition where an incident light path of the image pick-up means is opened, second pick-up control means for obtaining second image data output from the image pick-up means under a condition where the incident light path of the image pick-up means is closed, means for detecting a temperature around the image pick-up means, and means for correcting the first image data obtained by the first pick-up control means based on the temperature detected by the temperature detecting means and based on the second image data obtained by the second pick-up control means.

With this feature, it is possible to provide a camera capable of carrying out the correction processing for canceling the noise component from the image data without deteriorating the image quality, and capable of obtaining excellent image data.

According to the present invention, there is provided a still further camera comprises image pick-up means (an image sensor) for accumulating electric charges corresponding to incident light, converting accumulated electric charges into image data, and outputting the image data, first pick-up control means for obtaining first image data output from the image pick-up means under a condition where an incident light path of the image pick-up means is opened, second pick-up control means for obtaining second image data output from the image pick-up means under a condition where the incident light path of the image pick-up means is closed, means for detecting an electric charge accumulation period of the image pick-up means, and means for correcting the first image data obtained by the first pick-up control means based on the electric charge accumulation period detected by the detecting means and based on the second image data obtained by the second pick-up control means.

With this feature, it is possible to provide a camera capable of carrying out the correction processing for canceling the noise component from the image data without deteriorating the image quality, and capable of obtaining excellent image data.

According to the present invention, there is provided a signal processing method for a camera which carries out nonlinear processing for image data output from an image sensor, comprises a step of prohibiting the nonlinear processing for the image data output from the image sensor under a condition where an incident light path of the image sensor is opened, thereby obtaining first image data which are not subjected to the nonlinear processing, a step of prohibiting the nonlinear processing for the image data output from the image sensor under a condition where the incident light path of the image sensor is closed, thereby obtaining second image data which are not subjected to the nonlinear processing, and a step of correcting the first image data based on the second image data.

With this feature, it is possible to carry out the correction processing for canceling the noise component from the image data without deteriorating the image quality, and to obtain excellent image data.

According to the present invention, there is provided another signal processing method for a camera, comprises a step of obtaining first image data output from an image sensor under a condition where an incident light path of the image sensor is opened, a step of obtaining second image data output from an image sensor under a condition where an incident light path of the image sensor is closed, a step of determining whether an isolation point is included in the second image data, and a step of correcting the first image data based on a result of the determination.

With this feature, it is possible to carry out the correction processing for canceling the noise component from the image data without deteriorating the image quality, and to obtain excellent image data.

According to the present invention, there is provided a further signal processing method for a camera, comprises a step of obtaining first image data output from an image sensor under a condition where an incident light path of the image sensor is opened, a step of obtaining second image data output from an image sensor under a condition where an incident light path of the image sensor is closed, a step of determining whether a level of the first image data is saturated, and a step of correcting the first image data based on a result of the determination and the second image data.

With this feature, it is possible to carry out the correction processing for canceling the noise component from the image data without deteriorating the image quality, and to obtain excellent image data.

According to the present invention, there is provided a still another signal processing method for a camera, comprises a step of obtaining first image data output from an image sensor under a condition where an incident light path of the image sensor is opened, a step of obtaining second image data output from an image sensor under a condition where an incident light path of the image sensor is closed, a step of detecting a temperature around the image sensor, and a step of correcting the first image data based on the second image data when the detected temperature satisfies a predetermined condition.

With this feature, it is possible to carry out the correction processing for canceling the noise component from the image data without deteriorating the image quality, and to obtain excellent image data.

According to the present invention, there is provided a still further signal processing method for a camera, comprises a step of obtaining first image data output from an image sensor under a condition where an incident light path of the image sensor is opened, a step of obtaining second image data output from an image sensor under a condition where an incident light path of the image sensor is closed, a step of detecting an electric charge accumulation period of the image sensor, and a step of correcting the first image data based on the second image data when the detected electric charge accumulation period satisfies a predetermined condition.

With this feature, it is possible to carry out the correction processing for canceling the noise component from the image data without deteriorating the image quality, and to obtain excellent image data.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 7 is a block diagram showing a brief structure of a signal processing LSI including a γ-correction/processing circuit;

FIG. 12 is a block diagram showing a structure of an essential portion of a fourth embodiment of the camera according to the invention;

DETAILED DESCRIPTION OF THE INVENTION

A preferred embodiment of a camera according to the present invention will now be described with reference to the accompanying drawings.

Embodiments of a camera according to the present invention will be explained with reference to the drawings below.

First Embodiment

Figure 1:
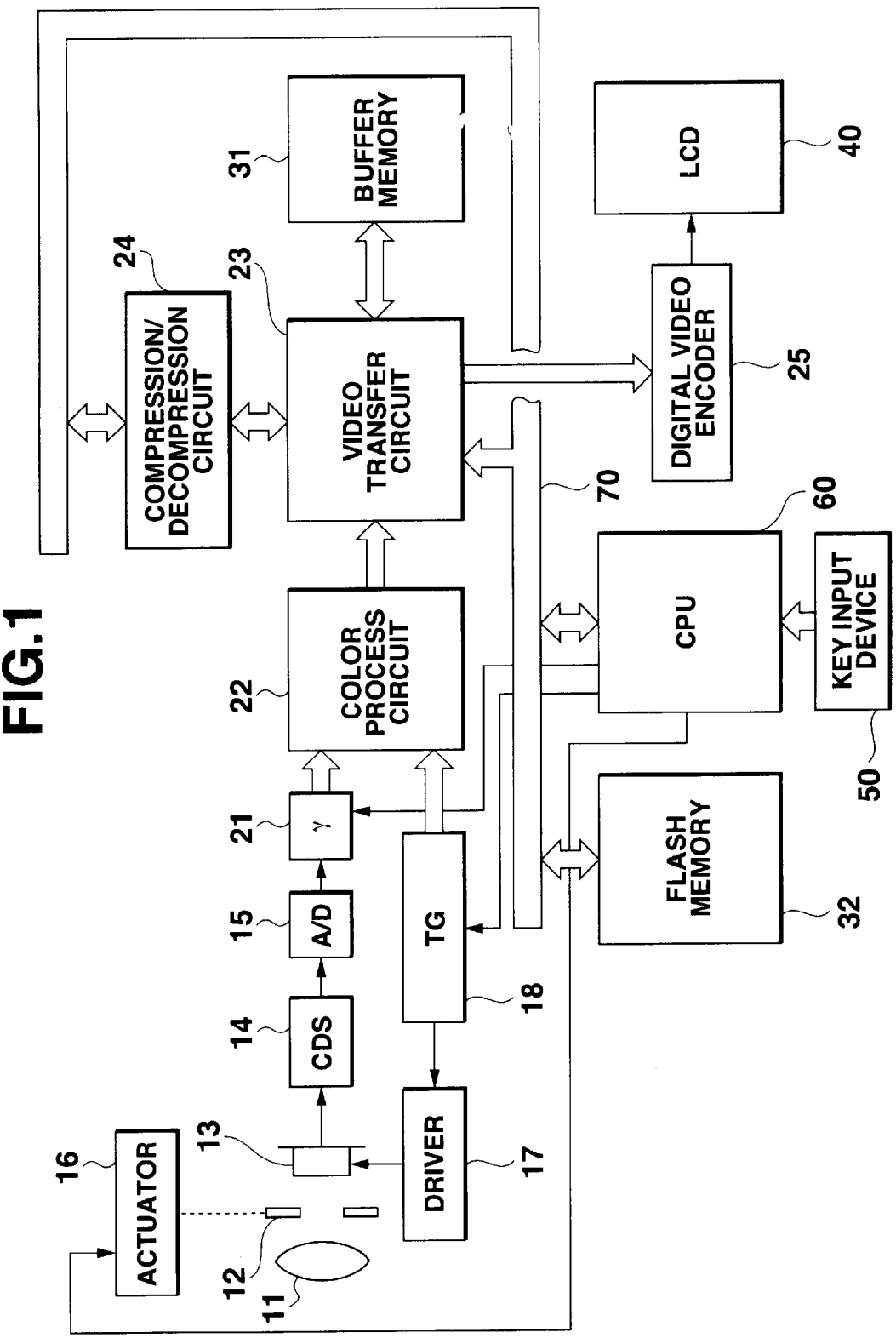
FIG. 1 is a block diagram showing a brief structure of a first embodiment of a camera according to the present invention.

FIG. 1 is a block diagram showing a brief structure of a first embodiment of a camera according to the present invention. A CCD 13 is provided behind an objective lens 11 with a mechanical shutter 12 interposed therebetween, and a driver 17 is connected to the CCD 13. Output of the CCD 13 is supplied to a video transfer circuit 23 through a correlation double sampling circuit (CDS) 14, an analog-digital converter 15, a γ-correction circuit (nonlinear processing means) 21 and a color process circuit 22. Output of a timing generator 18 is supplied to the color process circuit 22 also. A compression/decompression circuit 24 is connected to the video transfer circuit 23 and a buffer memory (storing means) 31. The video transfer circuit 23 and the compression/decompression circuit 24 are connected to a bus line 70 of a CPU (Central Processing Unit) 60 together with a flash memory (memory means) 32 as an image memory. A key input device 50 is connected to the CPU 60. Output of the video transfer circuit 32 is supplied to a liquid crystal display (display means) 40 through a digital video encoder 25. The mechanical shutter 12 is controlled by an actuator 16 under control of the CPU 60. The objective lens 11, the mechanical shutter 12, the CCD 13, the driver 17, the timing generator 18, the CDS 14, the analog-digital converter 15, the γ-correction circuit 21 and the color process circuit 22 constitute an image pick-up means. The digital video encoder 25 and the liquid crystal display 40 constitute a display means.

Outlines of functions of the above-described individual parts are as follows:

Objective Lens 11:

It is for forming an image of a subject on a light-receptive surface of the CCD 13, and includes a focusing mechanism for an automatic focusing function. The objective lens 11 may include a zooming function and may be of retractable type.

Mechanical Shutter 12 and Actuator 16:

They are for mechanically intercepting incident light to the light-receptive surface of the CCD 13. The actuator 16 opens and closes the mechanical shutter 12 in accordance with a control signal from the CPU 60. The mechanical shutter 12 opens an optical path to the light-receptive surface of the CCD 13, and closes the optical path at the time of closing state.

CCD 13:

It is a CCD of interlace type, and can switch the reading of field and the reading of frame by externally controlling. The exposure time at the time of reading of the field is controlled by opening/closing operation (application timing of SUB and XSG) of the electrical shutter, and the exposure time at the time of reading of the frame is controlled by opening/closing operation (application timing of SUB) and the mechanical shutter 12. The reading of the field (which is also called accumulation of field), and the reading of the frame (which is also called accumulation of frame) will be explained later.

A concrete structure of the CCD which is excellently applied to the camera of the present embodiment will be explained with reference to the drawings.

Figure 2:
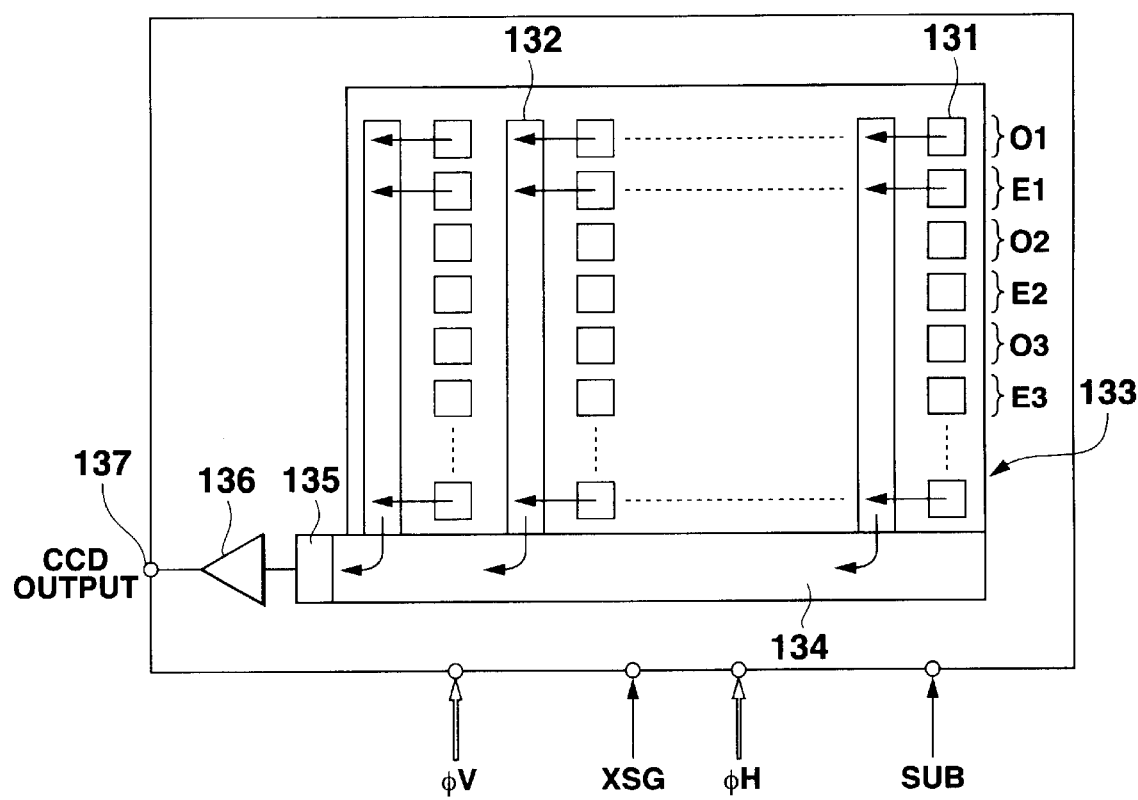
FIG. 2 is a schematic block diagram of a CCD having n columns×m rows pixels applied to the camera of the first embodiment.

FIG. 2 is a schematic block diagram of the CCD having n columns×m rows pixels.

As shown in FIG. 2, in the CCD, n×m matrix of photoelectric converters 131 are arranged. The photoelectric converters 131 accumulate electric charge corresponding to incident light amount. Total n-number of vertical transfer means 132 are arranged between adjacent columns to form a pick-up region 133, and a horizontal transfer means 134 is disposed on one end of the vertical transfer means 132.

Signal charges accumulated in the photoelectric converters 131 are sent to the adjacent vertical transfer means 132 in replay to a reading out signal XSG applied from the driver 17 (FIG. 1) which is not shown in FIG. 2, and are sequentially transferred downward as viewed in the drawing in synchronization with vertical transfer clock φV inside the vertical transfer means 132.

All output ends of the vertical transfer means 132 are connected to the horizontal transfer means 134. One horizontal line (row) of signal charges are sequentially sent to the horizontal transfer means 134 in synchronization with the vertical transfer clock φV. The signal charges sent to the horizontal transfer means 134 are sequentially transferred leftward in the drawing in synchronization with horizontal transfer clock φH. The signal charges which have reached the output end of the horizontal transfer means 134 are converted into electric signals by charge detector 135, and amplified by an amplifier 136 and then sent out as CCD outputs. The SUB is signal voltage (so-called charge discharge pulse) for pulling the accumulated charge of all the photoelectric converters 131 to a substrate. Time from application of this SUB to application of XSG is exposure time of the electric shutter ("electrical shutter", hereinafter) of the CCD.

The above-described reading of field means a system for mixing and outputting pixel signal of one odd-numbered line and one even-numbered line as one signal, for example, an odd-numbered line O1 and an even-numbered line E1, an odd-numbered line O2 and an even-numbered line E2, . . . , of the photoelectric converter 131. The reading of frame means a system for dividing frames into two, i.e., odd-numbered frames (O1, O2, O3, . . . ) and even-numbered frames (E1, E2, E3, . . . ), and outputting the CCD.

A recent electronic still camera in which LCD is mounted employs a through image mode which displays an image of a subject on an LCD screen as through image, thereby adjusting the composition. In such an operation mode, the through image is renewed every exposure time by the electrical shutter.

On the other hand, in the through image mode, when a desired composition is obtained, a capture operation is carried out in which a shutter key is pressed to store an image of a subject in a memory or the like as a capture image. In the capture operation, a mechanical shutter mechanism (the above-described mechanical shutter) for intercepting incident light to the CCD is indispensable for freezing the subject image formed on the CCD. A period from time when the exposure of the electrical shutter is started by pushing the shutter key (key input device 50) to time when the mechanical shutter is closed to intercept the incident light is exposure time of the mechanical shutter.

Driver 17 and TG 18:

They generate driving signals necessary for reading of CCD 13 (e.g., φV, XSG, φH, SUB), and the CCD 13 outputs image signals in synchronization with these driving signals.

CDS 14:

It carries out correlation double sampling processing for time-series signals read out from the CCD 13 at frequency corresponding to resolution of the CCD 13. Automatic gain control is carried out after sampling in some cases.

A/D 15:

It converts sampled analog signal into digital signal.

γ-Correction Circuit 21:

It includes function to carry out a first correction processing for carrying out γ-correction based on γ-correction table having normal nonlinear characteristics, and to carry out a second correction processing for changing the γ-correction table into linear characteristics to carry out the γ-correction.

Here, γ-correction circuit 21 may integrally formed with other signal processing circuits such as a digital clamping circuit and a white balance correction processing circuit which will be explained later.

Color Process Circuit 22:

It carries out known color signal processing such as interpolation processing of the three primary colors including R, G and B, exposure calculation (AE) and white balance processing (AWB) based on output signal from the γ-correction circuit 21, and generation of brightness and color-difference multiplex signals (YUV signals) based on image information which were converted into digital signals.

The reason why the YUV signal is generated is that since the size of color data (RGB data) output from camera system is great, the YUV signal is used as data amount reducing signal for the purpose of effectively utilizing the limited memory and reducing the processing time. The color signal processing in the color process circuit 22 may be carried out by a signal processing circuit including the γ-correction circuit 21, or may be carried out by providing another signal processing circuit behind the color process circuit 22.

Video Transfer Circuit 23:

It controls flow of data skipping between the color process circuit 22, the buffer memory 31, the compression/decompression circuit 24, the flash memory 32, the digital video encoder 25 and the LCD 40.

More specifically, the video transfer circuit 23 writes or reads image data between the flash memory 32 and the buffer memory 31 which stores image data generated by the color process circuit 22 through the compression/decompression circuit 24, and displays the image data stored by the buffer memory 31 on the LCD 40.

Compression/decompression Circuit 24:

It carries out compression and decompression in JPEG (Joint Photographic Experts Group) encoding manner. Compression parameter of JPEG may be fixed or given by the CPU 60 whenever the compression is carried out.

Digital Video Encoder 25:

It converts image data read out from the buffer memory 31 through the video transfer circuit 23 into analog voltage, and sequentially outputs the voltage at timing corresponding to scanning system mode of the LCD 40.

Buffer Memory 31:

It comprises a DRAM which is one kind of rewritable semiconductor memory. However, the buffer memory 31 in the present invention is not limited to the DRAM, and may be any kind of rewritable semiconductor memory.

Flash Memory 32:

It is a PROM (programmable read only memory) but which must be memory capable of electrically erasing and rewriting data in all bits (or the unit of block). This memory is also called a flash EEPROM (flash electrically erasable PROM). The flash memory 32 of the present embodiment may be fixed memory which is embedded in the camera body or may be of removable type such as card type or package type.

CPU 60:

It concentrically controls operation of the entire camera by executing a predetermined program. The program is written in an instruction ROM in the CPU 60. At the time of recording mode, a recording mode program is loaded into an internal RAM and executed, and the program outputs a control signal which opens or closes the mechanical shutter, a control signal which drives the CCD 13 and a control signal which changes the setting of characteristics of γ-correction table of the γ-correction process circuit 21.

Bus 70:

It is a transfer path for data (and addresses) commonly possessed by the above-described various portions.

Next, an image recording operation of the camera of the present embodiment will be explained with reference to the drawings. Here, a case in which the image recording operation of the camera of the present embodiment is applied to a camera (electronic still camera including LCD) having the above-described through image mode will be explained in detail.

<Normal Pick-up Mode>

First, a normal pick-up mode will be explained with reference to the drawings.

Figure 3:
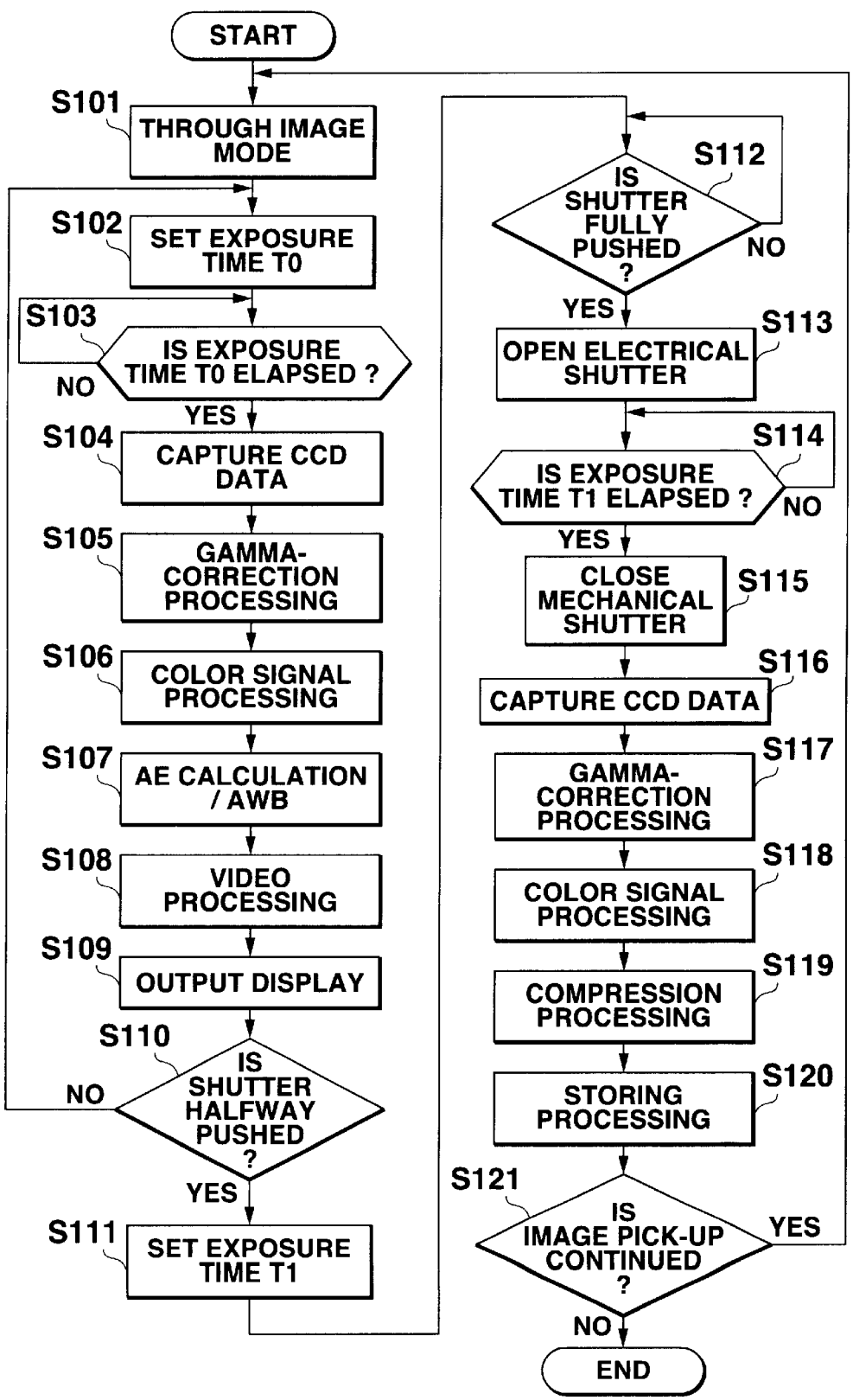
FIG. 3 is a flowchart showing a processing operation of a normal pick-up mode in the camera of the first embodiment.

FIG. 3 is a flowchart showing a processing operation of a normal pick-up mode in the camera of the first embodiment. Here, in FIG. 3, only points of the image recording operation will be shown using simplified terms.

Through Operation

After a user of the electronic still camera switches a mode switch included in the key input device 50 into a recording mode (REC), if he or she selects the normal pick-up mode from a menu displayed on the LCD 40, the mechanical shutter 12 is opened, and image information of a subject formed on the light-receptive surface of the CCD 13 is displayed and output on the LCD 40 as the through image every fixed period (exposure time).

That is, by switching the mode into the recording mode, the through image mode is set (S101), and the exposure time T0 is set based on various information such as brightness, focus length obtained from pick-up environment of the subject (S102). In the through image mode, opening and closing operation of the electrical shutter of the CCD 13 is controlled by the driver 17 and the TG 18 whenever the exposure time T0 is elapsed (S103), electric signal (CCD data) which is output from the CCD 13 every time when the electrical shutter is opened or closed is taken (S104), and it is converted into digital signal by the A/D 15 and subjected to the nonlinear γ-correction processing by the γ-correction circuit 21 (S105).

Then, color signal processing such as interpolation processing of the three primary colors including R, G and B, exposure calculation (AE) white balance processing (AWB), generation of brightness and color-difference multiplex signals are executed (S106, S107), and a frame of image data are generated.

The image data generated by the color process circuit 22 are transferred to the buffer memory 31 by the video transfer circuit 23 and then, are subjected to video processing by the digital video encoder 25 (S108), and converted into signal corresponding to display mode of the LCD 40 and displayed and output as the through image (S109).

Capture Operation

In the through image operation, if a viewing direction of the camera body or the objective lens is changed, composition of the through image displayed on the LCD 40 is changed. When a through image having desired composition is obtained, if the shutter key provided on the key input device 50 is "halfway pushed" (S110), exposure time T1 and the focus are set (S111) based on information obtained from the pick-up environment of the subject, and if the shutter key is "fully pushed", the electrical shutter is opened (S112, S113). After the exposure time T1 set in step S111 is elapsed (S114), the mechanical shutter 12 is closed by the driver 17 and the TG 18 (S115), CCD data output from the CCD 13 are captured (S116), the data are converted into digital signals by the A/D 15 and are subjected to the nonlinear γ-correction processing by the γ-correction circuit 21 (S117).

Next, the color signal processing such as interpolation processing of the three primary colors including R, G and B, exposure calculation (AE) white balance processing (AWB) are executed (S118), a frame of image data is generated, and it is transferred to the buffer memory 31 by the video transfer circuit 23. At that time, the image data captured into the buffer memory 31 is frozen as the subject image formed on the CCD 13 at the instant when the mechanical shutter 12 is closed, and the through image displayed on the LCD 40 is also frozen as the image at the same instant.

Further, after compression processing such as JPEG encoding is carried out by the video transfer circuit 23 through the compression/decompression circuit 24 (S119), the image is recorded as a frame of captured image in the flash memory 32 (S120). When pick-up is continued, i.e., when the normal pick-up mode is not canceled (S121), the flow proceeds back to step S101 where the mechanical shutter 12 is opened, and the through image mode is set (S101). A series of processing operations in the above-described steps S101 to S121 are repeated.

According to the camera having such a series of processing operations, the exposure time (accumulation period) T1 suitable for relatively bright normal pick-up condition, and after image data of a subject are captured, predetermined signal processing such as the nonlinear γ-correction processing is executed, and the pick-up and image recording operations are carried out excellently.

<Special Effect Pick-up Mode>

Next, a special effect pick-up mode suitable for pick-up a dark object, such as nightscape will be explained with reference to the drawings.

Figure 4:
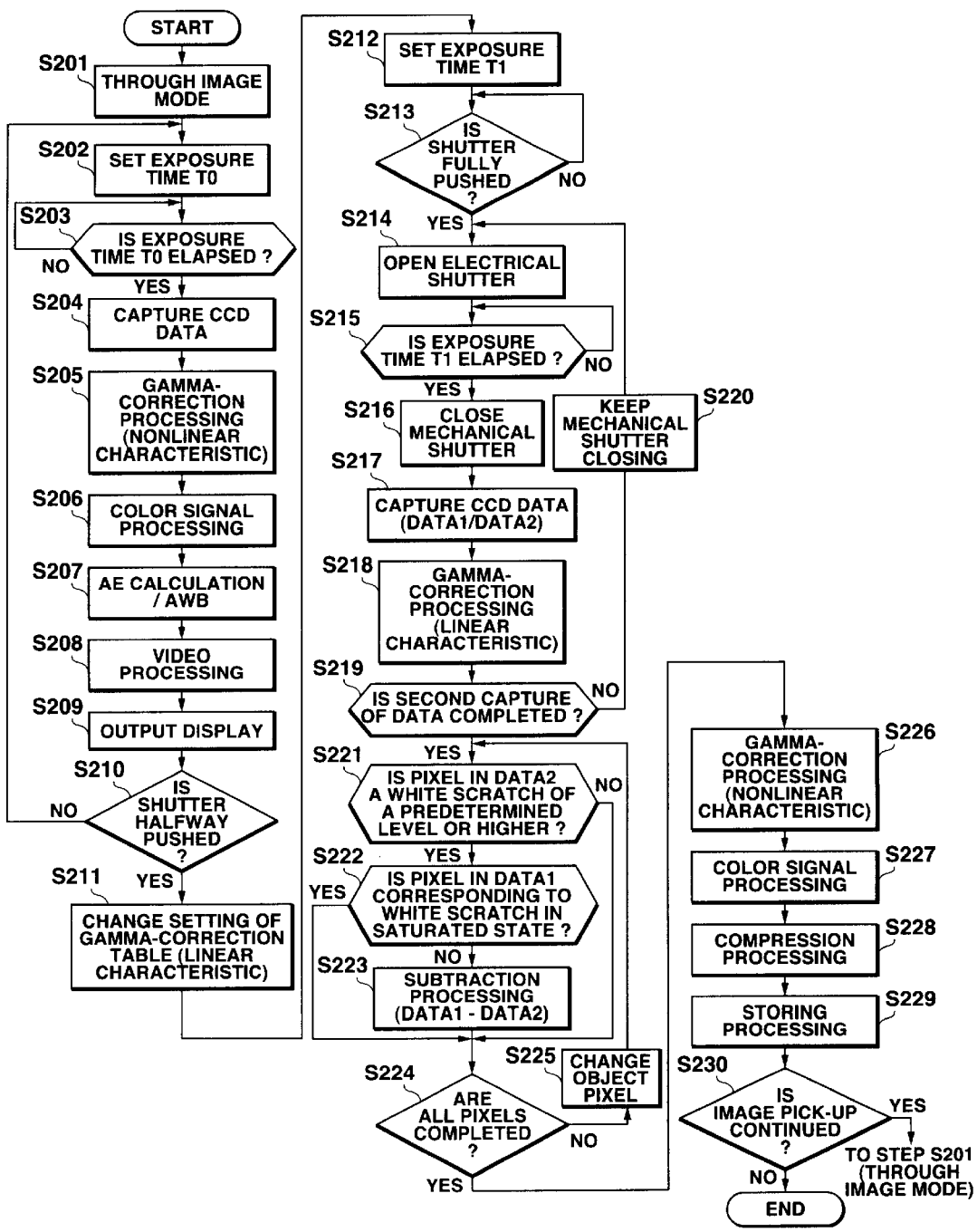
FIG. 4 is a flowchart showing a processing operation of a special effect pick-up mode in the camera of the first embodiment.

FIG. 4 is a flowchart showing a processing operation of the special effect pick-up mode in the camera of the present embodiment. Here, in FIG. 4, only points of the image recording operation will be shown using simplified terms.

Through Operation

After a user of the electronic still camera switches a mode switch included in the key input device 50 into a recording mode (REC), if he or she selects the special effect pick-up mode from a menu displayed on the LCD 40, the mechanical shutter 12 is opened, and a through image mode is set (S201). Exposure time T0 is set (S202) based on various information such as brightness and focus length obtained from the pick-up environment of the subject. In the through image mode, whenever the exposure time T0 is elapsed (S203), opening and closing operation of the electrical shutter of the CCD 13 is controlled by the driver 17 and the TG 18 whenever the exposure time T0 is elapsed (S203), electric signal (CCD data) which is output from the CCD 13 every time when the electrical shutter is opened or closed is taken (S204), and it is converted into digital signal by the A/D 15 and subjected to the nonlinear γ-correction processing by the γ-correction circuit 21 (S205) as in the normal pick-up mode.

Then, color signal processing such as interpolation processing of the three primary colors including R, G and B, exposure calculation (AE) white balance processing (AWB), generation of brightness and color-difference multiplex signals are executed (S206, S207), and a frame of image data is generated.

The image data generated by the color process circuit 22 is transferred to the buffer memory 31 by the video transfer circuit 23 and then, is subjected to video processing by the digital video encoder 25 (S208), and converted into signal corresponding to display mode of the LCD 40 and displayed and output as the through image (S209).

Capture Operation

Next, when a through image having a desired composition is displayed on the LCD 40, if the shutter key provided on the key input device 50 is "halfway pushed" (S210), the CPU 60 detects the start of the recording operation, outputs a control signal to the γ-correction circuit 21, and changes the characteristic setting of the γ-correction table from the nonlinear characteristic to the linear characteristic (S211). Exposure time T1 and focus are set based on information obtained from the pick-up environment of the subject (S212).

If the shutter key is further pushed, i.e., "fully pushed", the electrical shutter is opened. After the exposure time T1 set in step S212 is elapsed (S215), the mechanical shutter 12 is closed by the driver 17 and the TG 18 (S216), CCD data (DATA1: first image data) of the subject image output from the CCD 13 is captured (S217), the data is converted into digital data by the A/D 15 and is subjected to the linear γ-correction processing by the γ-correction circuit 21 based on the γ-correction table which was changed into linear characteristic in step S211 (S218). When the mechanical shutter 12 is closed in steps S216 and S217 and the CCD output data (DATA1) is captured from the CCD 13, the electrical shutter is closed.

Next, under a condition where the mechanical shutter 12 is closed (S220), the electrical shutter is again opened (S214), each of the processing of steps S214 to 218 is executed using the exposure time T1 set in step S212, thereby capturing CCD output data (DATA2: second image data) including dark output component generated by the CCD 13 in the current pick-up condition but not including the subject image, and the data is subjected to the linear γ-correction processing by the γ-correction circuit 21 based on the γ-correction table having the linear characteristic. The CCD output data (DATA1, DATA2) captured by each of the processing of the above-described steps S214 to S218 and subjected to the γ-correction may be temporarily stored in the buffer memory 31, or may be stored in an RAM (not shown) added to the CPU 60 which executes subtraction processing which will be described later.

As described above, when the CCD output data (DATA1, DATA2) have been captured twice (S219), it is determined whether pixel data (pixel which is to be subjected to the determining processing) in the CCD output data (DATA2) which was captured at the second time is a white scratch of a predetermined level or higher, i.e., an isolation point (S221). When it is determined that the pixel data is the white scratch, it is determined whether the level of the pixel data in the DATA1 corresponding to that pixel is saturated (S222).

As a result of such a series of determining processing (S221, S222), if it is determined that the pixel data in the CCD output data (DATA2) which was captured at the second time is not the white scratch of the predetermined level or higher, the pixel data corresponding to the DATA1 is regarded as effective data which need not correction processing. Even when the pixel data in the CCD output data (DATA2) which was captured at the second time is the white scratch of the predetermined level or higher, if the level of the pixel data in the DATA1 corresponding to that pixel is saturated, the pixel data corresponding to the DATA1 is regarded as data which need not correction processing. Details of the determining processing in steps S221 and S222 will be described later.

If the pixel data in the CCD output data (DATA2) which was captured at the second time is the white scratch of the predetermined level or higher and the level of the pixel data in the DATA1 corresponding to that pixel is not in the saturated state, it is determined that the corresponding pixel data in DATA1 is data which should be subjected to the correction processing, correction processing (subtraction processing) in which CCD output data (DATA2) captured at the second time is subtracted from CCD output data (DATA1) captured at the first time, i.e., correction processing in which dark output component possessed by the CCD 13 commonly included in the CCD output data (DATA1) and the CCD output data (DATA2) is executed (S223).

The pixel which is to be subjected to the determining processing of the white scratch and the correction processing is sequentially changed (S225), and after a frame of all the pixels output from the CCD 13 is subjected to the processing (S224), each of the pixel data is subjected to the nonlinear γ-correction processing (S226), and the color signal processing such as interpolation processing of the three primary colors including R, G and B, exposure calculation (AE) white balance processing (AWB) are executed (S227), and a frame of image data are transferred to the buffer memory 31 by the video transfer circuit 23. The nonlinear γ-correction processing in step S226 does not use the above-described γ-correction processing circuit 21, but executes the nonlinear γ-correction processing (S205) equal to that of the through operation using software by the CPU 60.

Further, after compression processing such as JPEG encoding is carried out by the video transfer circuit 23 through the compression/decompression circuit 24 (S228), the image is recorded as a frame of captured image in the flash memory 32 (S229). When pick-up is continued, i.e., when the special effect pick-up mode is not canceled (S230), the flow proceeds back to step S201 where the mechanical shutter 12 is opened, and the through image mode (including change of settings to the nonlinear characteristic of the γ-correction table) is set (S201). A series of processing operations in the above-described steps S201 to S230 are repeated.

Next, the relation between the characteristic setting of the above-described γ-correction processing and the subtraction processing (dark output component of the CCD is cancelled from the image data of the subject image) will be explained with reference to the drawings.

Figure 5A:
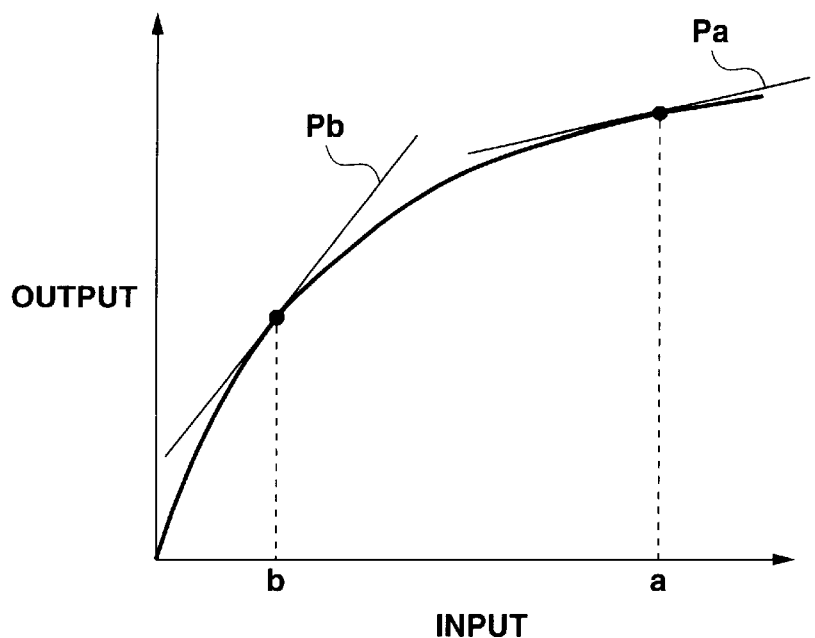
FIGS. 5A and 5B are graphs showing effect of a subtracting processing when a nonlinear γ-correction processing is carried out.
Figure 5B:
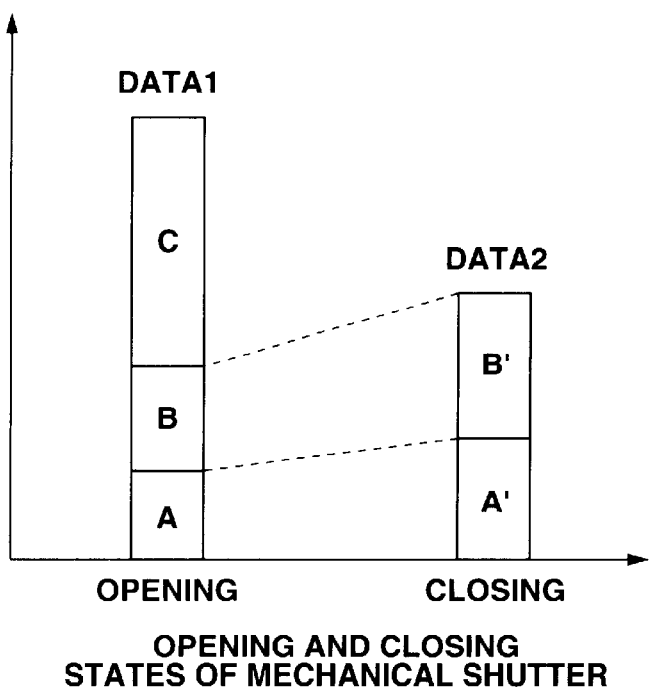
Figure 6A:
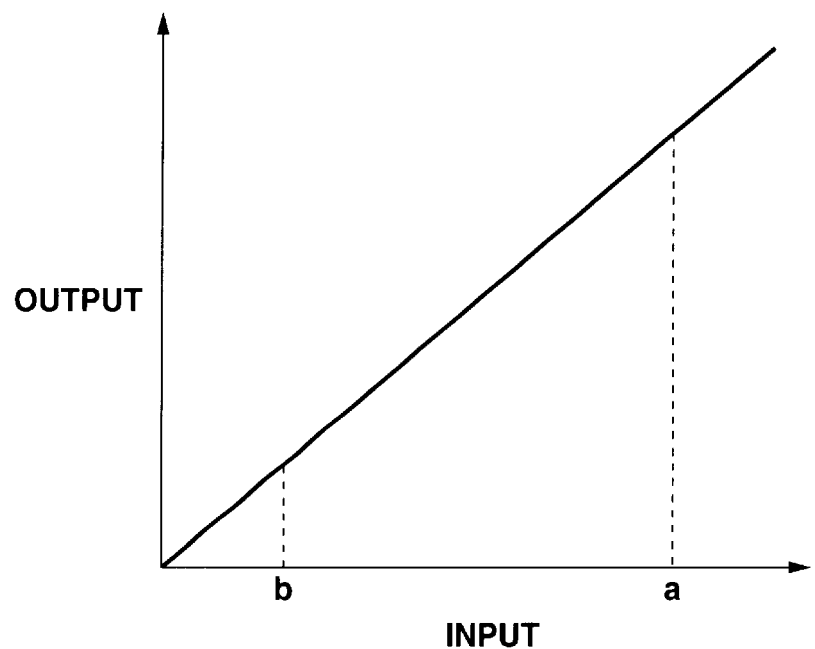
FIGS. 6A and 6B are graphs showing effect of a subtracting processing when a linear γ-correction processing is carried out.
Figure 6B:
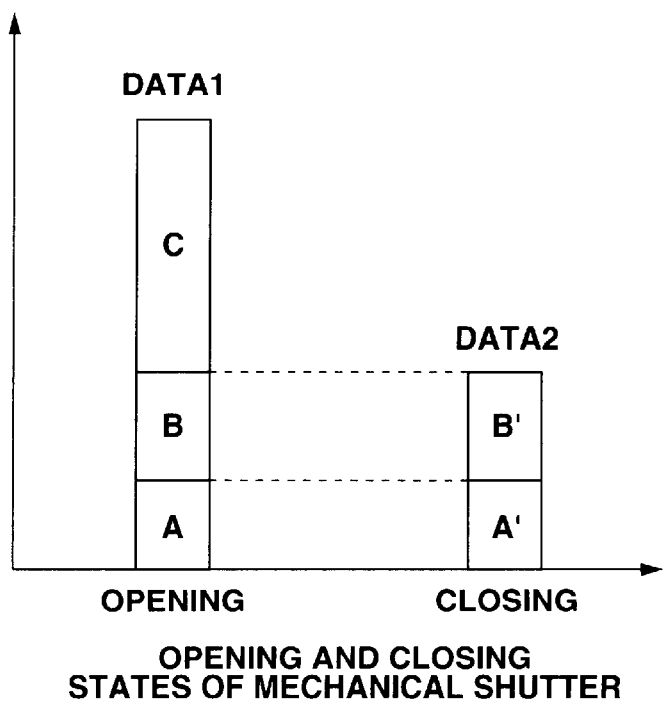

FIGS. 5A and 5B are graphs showing effect of a subtracting processing when the nonlinear γ-correction processing is carried out, i.e., when step 211 shown in the flowchart of FIG. 4 is not performed so that the γ-correction table of the γ-correction circuit 21 is not changed to the linear characteristic. FIGS. 6A and 6B are graphs showing effect of the subtracting processing when the linear γ-correction processing is carried out for the DATA 1 and DATA 2, i.e., when the γ-correction table of the γ-correction circuit 21 was changed to the linear characteristic in step S211 shown in the flowchart of FIG. 4.

First, as shown in FIG. 5A, when input/output signal characteristic in the γ-correction circuit 21 is nonlinear, the relation between gradients Pa and Pb on characteristic curve with respect to input levels "a" and "b" is Pa<Pb.

On the other hand, as shown in FIG. 5B, data level of the CCD output data DATA1 captured at the first time under a condition where the mechanical shutter 12 is opened is equal to a sum total of original data component "C" of the subject image, random noise component "A" and dark voltage component (or white scratch component) "B". Data level of the CCD output data DATA2 captured at the second time under a condition where the mechanical shutter 12 is closed is equal to a sum total of random noise component "A'" and dark voltage component "B'", since the data component "C" of the subject image is not included.

Therefore, the DATA1 having greater data level is gently inclined, i.e., γ-correction processing is carried out with small γ-coefficient. Whereas, the DATA2 having smaller data level is steeply inclined i.e., γ-correction processing is carried out with great γ-coefficient. Therefore, the dark voltage components "B" and "B'" do not coincide with each other due to the nonlinear γ-correction processing, and there is a problem that the dark voltage component can not be cancelled properly by the subtraction processing which subtracts the DATA2 from the DATA1.

Whereas, as shown in FIG. 6A, when input/output signal characteristic in the γ-correction circuit 21 is linear, the relation between gradients Pa and Pb on characteristic curve with respect to input levels "a" and "b" is always equal to each other.

Therefore, in both the DATA1 having great data level and the DATA2 having small data level, γ-correction processing is carried out with constant γ-coefficient and thus, the dark voltage components "B" and "B'" are always equal to each other, and the dark voltage component can be cancelled properly by the subtraction processing which subtracts the DATA2 from the DATA1.

Next, the above-described γ-correction circuit 21 will be explained with reference to the drawings.

FIG. 7 is a block diagram showing a brief structure of the signal processing large-scale integrated (LSI) circuit 20 including the γ-correction processing circuit 21.

As described above, characteristic setting of the γ-correction circuit 21 should be variable. Further, a recent camera such as an electronic still camera is supplied under a condition where the γ-correction circuit is incorporated in one chip LSI together other another signal processing circuit in many cases.

Therefore, as shown in FIG. 7, the signal processing LSI 20 comprises a digital/clamp processing unit 20A which inputs a signal (CCD output data in the drawing) which is output from the CCD 13 and sampled and converted into digital data by the CDS 14 and the A/D 15 and which clamps at a predetermined black level, a shading correction processing unit 20B for correcting shading when the shading is generated in optical system such as the objective lens 11, a white balance correcting unit 20C, and a γ-correcting processing unit 20D including a γ-correction table 20E capable of changing the characteristic settings. The γ-correction table 20E is capable of changing (or switching) the settings of y-characteristic into nonlinear or linear. The γ-correcting processing unit 20D and γ-correction table 20E correspond to the γ-correction processing circuit 21.

In the present embodiment, by the signal processing LSI 20, the CCD output data output from the CCD 13 is subjected to the normal nonlinear γ-correction processing (first correction processing) at the time of the through operation and the capture operation in the normal pick-up mode, and is subjected to the linear γ-correction processing (second correction processing) at the time of the capture operation in the special effect pick-up mode.

As described above, at the time of the capture operation in the special effect pick-up mode, normal nonlinear γ-correction processing similar to that of the through operation is executed using software in a later processing (e.g., step S226 in FIG. 4).

In the present embodiment, reason why it is determined whether the level of the pixel in the DATA1 corresponding to pixel determined as having white scratch in DATA2 is in the saturated state as a condition which determines whether the subtraction processing should be executed is that irrespective of saturated state of the pixel data in DATA1 (e.g., even if the level of the pixel data is substantially equal to a threshold value for determining the saturated state or largely exceeds the threshold value), in the above subtraction processing, since level of white scratch of the corresponding DATA2 is always subtracted from the saturated level, level calculated form the pixel data which is in the saturated state is lower than original level of the pixel data, and there is a problem that image quality is deteriorated, e.g., tone is displayed lower as compared with peripheral pixels.

Especially, human eye has characteristics to sensitively sense a fine black point (lower gradation) in the white background (higher gradation) strongly, as compared with a fine white point (higher gradation) in the black background (lower gradation). Therefore, if image data in the saturated state is subjected to the subtraction processing as described above, the level of the pixel is displayed black (lower gradation) as compared with surrounding pixels, and the deterioration of image quality is sensed strongly.

For this reason, image data in DATA1 whose level is in saturated state are not subjected to the subtraction processing, and level of white scratch pixel of the corresponding DATA2 of only image data whose level is in saturated state is subtracted, thereby appropriately correcting the image data level in the DATA1 to the original level, so that the deterioration of image quality is suppressed.

According to the camera having the above-described series of processing operations, under a condition where the settings of the γ-correction table are changed to linear characteristic and γ-correction processing (nonlinear processing) by the γ-correction circuit is substantially prohibited (linear processing is carried out), if the CCD output data (DATA2) obtained under a condition where the optical path of incident light to the CCD 13 is closed is subtracted from the CCD output data (DATA1) obtained under a condition where the optical path of incident light (mechanical shutter 12) to the CCD 13 is opened, it is possible to excellently eliminate the noise component caused by dark voltage even if the image was picked-up with long exposure time and therefore, it is possible to excellently pick-up even under dark environment such as nightscape.

Even when pick-up condition or pick-up environment is changed, it is possible to capture CCD output data (DATA1, DATA2) suitable for the condition or environment, and it is possible to appropriately eliminate the varying dark voltage component by the subtraction processing. Therefore, it is possible to appropriately pick-up a subject image and store the image with the simple structure.

Further, since it is determined whether there exists a white scratch and whether the data level is in saturated state for the CCD output data (DATA1, DATA2), and the subtraction processing is carried out to lower the affect of the white scratch against the image data of the subject, isolation point (white scratch) caused by dark voltage is eliminate, and it is possible to appropriately pick-up a subject image and store the image.

In the above-described embodiment, it is determined whether there exists a white scratch (S221) and whether the data level is in saturated state (S222) per unit of pixel data. Alternatively, the DATA2 may be directly subtracted from the DATA 1 without carrying out the processing (S221 to S225).

Other embodiments of the camera according to the present invention will be described. The same portions as those of the first embodiment will be indicated in the same reference numerals and their detailed description will be omitted.

Second Embodiment

Figure 8:
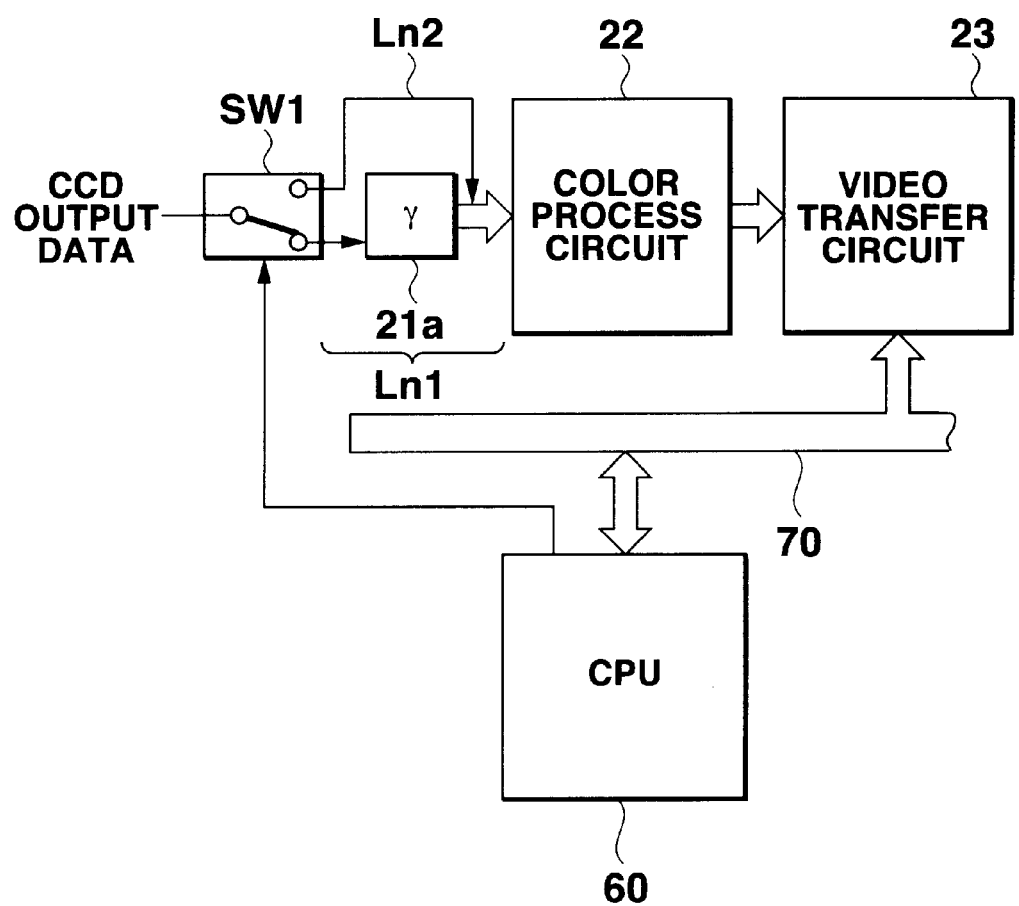
FIG. 8 is a block diagram showing a structure of an essential portion of a second embodiment of the camera according to the invention.
Figure 9:
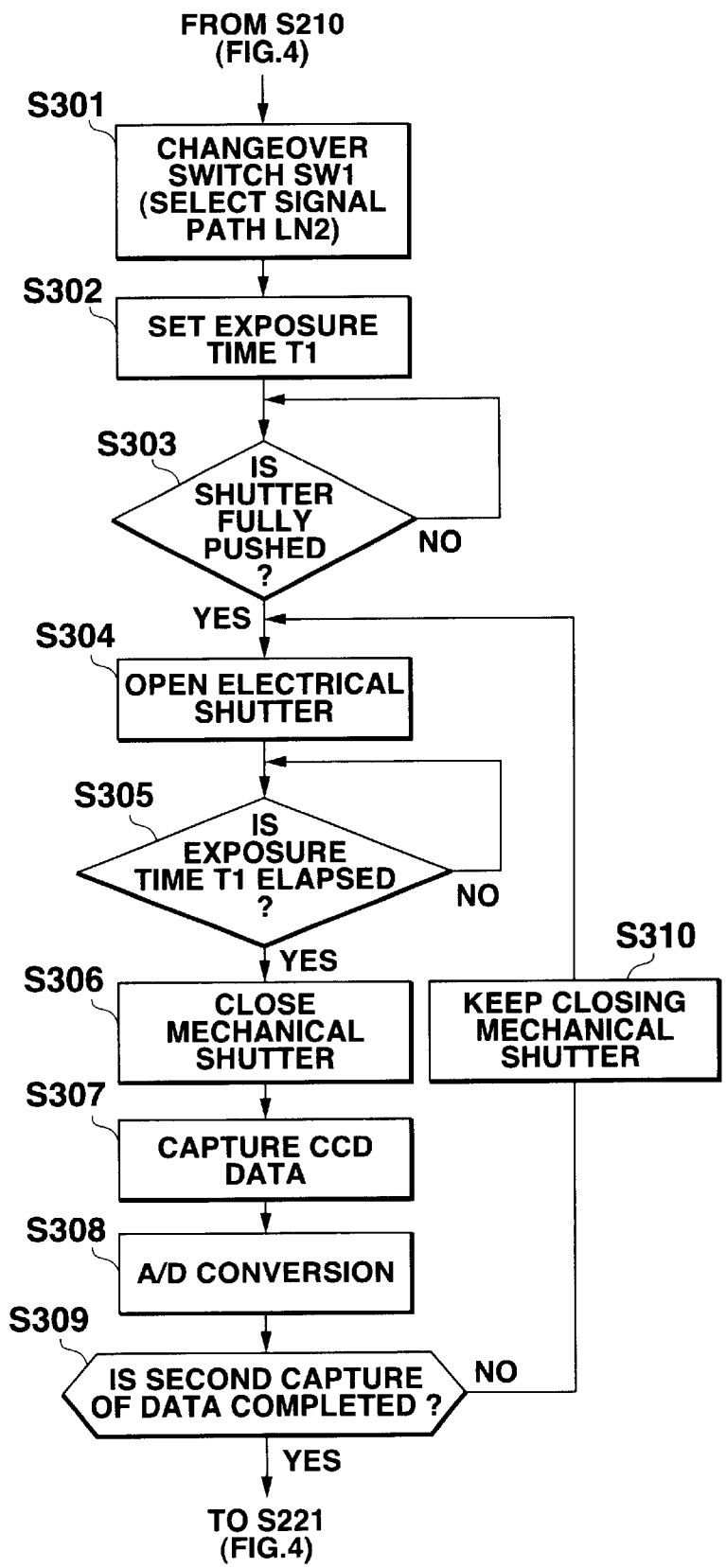
FIG. 9 is a flowchart showing a main processing operation of the second embodiment of the camera according to the invention.

FIG. 8 is a block diagram showing a structure of an essential portion of the second embodiment of the camera according to the invention, and FIG. 9 is a flowchart showing a main processing operation of the second embodiment of the camera according to the invention. The same structures and processing operation as those in the above-described embodiment are designated with the same symbols, and explanation thereof will be omitted or simplified.

As shown in FIG. 8, the camera of the present embodiment includes, in addition to the structure of the above-described first embodiment (FIG. 1), a bypass path Ln2 bypassing a γ-correction circuit 21a, and a switch SW1 for selectively switching a first signal path Ln1 passing through the γ-correction circuit 21a and the bypass path (second signal path) Ln2.

The switch SW1 is controlled by a control signal from the CPU 60. That is, the CPU 60 controls such that in the normal pick-up mode and the through image mode, the first signal path Ln1 passing through the γ-correction circuit 21a is selected, and when the CCD output data (DATA1, DATA2) used for the correction processing to eliminate the dark voltage component of the CCD 13 are captured, the bypass path Ln2 which does not include the γ-correction circuit 21a is selected. The γ-correction circuit 21a is arranged to execute the γ-correction processing based on the γ-correction table having nonlinear characteristic which is previously fixedly set.

Concrete processing operation in the special effect pick-up mode will be explained with reference to the flowchart in FIG. 9. The flowchart in FIG. 4 is also referred to if necessary.

Through Operation

After a user of the electronic still camera switches a mode switch included in the key input device 50 into a recording mode (REC), if he or she selects the special effect pick-up mode from a menu displayed on the LCD 40, the mechanical shutter 12 is opened, the through image mode is set. At that time, a control signal is output from the CPU 60, and the switch SW1 is switched such as to select the first signal path Ln1 which passes through the γ-correction circuit 21a. In the through image mode, as in the processing operation (S201 to S209) shown in FIG. 4, CCD output data based on a subject image is captured whenever a predetermined exposure time T0 is elapsed, and the data is subjected to the nonlinear γ-correction processing by the γ-correction circuit 21a and the color signal processing by the color process circuit 22, and displayed on the LCD 40 as the through image.

Capture Operation

Next, when a through image having a desired composition is displayed on the LCD 40, if the shutter key provided on the key input device 50 is "halfway pushed" (S210), the CPU 60 detects the start of the recording operation, outputs a control signal to the switch SW1, and switches such as to select the second signal path Ln2 which does not pass through the γ-correction circuit 21a (S301). Exposure time T1 and focus are set based on information obtained from the pick-up environment of the subject (S302).

If the shutter key is further pushed, i.e., "fully pushed" (S303), the electrical shutter is opened (S304). After the exposure time T1 set in step S302 is elapsed (S305), the mechanical shutter 12 is closed by the driver 17 and the TG 18 (S306), CCD data (DATA1) of the subject image output from the CCD 13 is captured (S307), the data is converted into digital signals by the A/D 15 (S308). When the mechanical shutter 12 is closed in steps S306 and S307 and the CCD output data (DATA1) is captured from the CCD 13, the electrical shutter is closed.

Next, under a condition where the mechanical shutter 12 is closed (S310), the electrical shutter is again opened (S304), each of the processing of steps S304 to S308 is executed using the exposure time T1 set in step S302, thereby capturing CCD output data (DATA2) including dark output component generated by the CCD 13 in the current pick-up condition but not including the subject image, and the data is converted into digital data, and the data is subjected to the linear γ-correction processing by the γ-correction circuit 21 based on the γ-correction table having the linear characteristic. The CCD output data (DATA1, DATA2) captured by each of the processing of the above-described steps S214 to S218 and subjected to the γ-correction may be temporarily stored in the buffer memory 31, or may be stored in an RAM (not shown) added to the CPU 60 which executes subtraction processing which will be described later.

As described above, when the CCD output data (DATA1, DATA2) have been captured twice (S309), like the processing operation (S221 to S230) shown in FIG. 4, it is determined whether pixel data in the CCD output data (DATA2) which was captured at the second time is a white scratch of a predetermined level or higher, and whether the level of the pixel data in the DATA1 corresponding to that pixel is saturated, and it is determined whether the subtraction processing (correction processing for canceling dark output component) should be conducted.

The elimination of the dark output component based on the need of the subtraction processing is determined and executed and then, the linear γ-correction processing and the predetermined color signal processing are carried out by software, and compression processing such as encoding of JPEG is carried out, and the data is stored in the flash memory 32 as captured image. When the pick-up is to be continued, the through image mode is again set, thereby switching to select the first signal path Ln1 which passes through the γ-correction circuit 21a.

With this operation, in the circuit processing for canceling the dark voltage component, the second signal path Ln2 bypassing the -correction circuit 21a is selected, the γ-correction processing (nonlinear processing) of the CCD output data (DATA1, DATA2) is prohibited. Since the DATA1 and the DATA2 are not subjected to the nonlinear processing as in the case explained with reference to FIG. 6, the noise component caused by the dark voltage is excellently cancelled by subtracting the DATA2 from DATA1. In this case, since it is possible to prohibit the correction processing for the CCD output data (DATA1, DATA2) by switching the switch SW1 without changing the settings of the γ-correction table of the γ-correction circuit 21a, the noise component caused by the dark voltage can be excellently cancelled with simple structure.

In the normal pick-up mode, the same operation processing as that shown in the flowchart in FIG. 3 is carried out, and at the instant when the through image mode is set (S101), a control signal is output from the CPU 60, and the switch SW1 is switched to the first signal path Ln1 which passes through the γ-correction circuit 21a, so that the through operation and the capture operation are excellently carried out.

Third Embodiment

Next, a third embodiment of the camera of the present invention will be explained with reference to the drawings.

Figure 10:
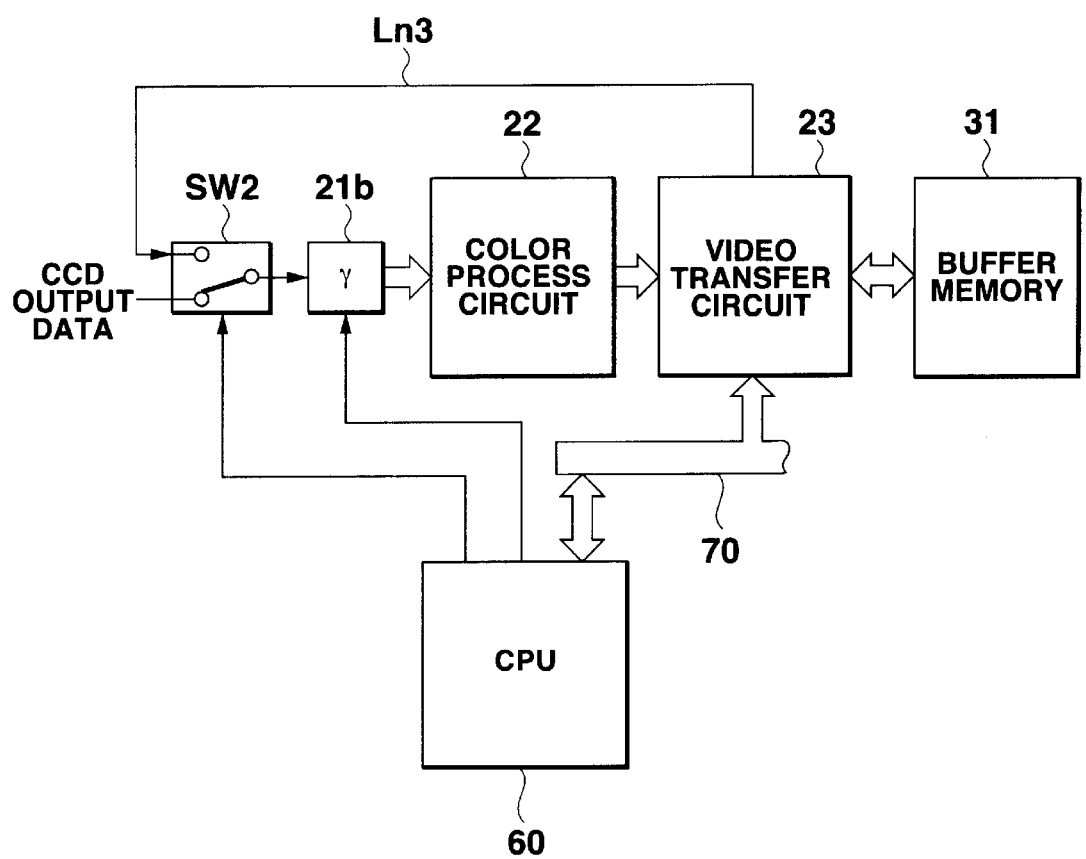
FIG. 10 is a block diagram showing a structure of an essential portion of a third embodiment of the camera according to the invention.
Figure 11A:
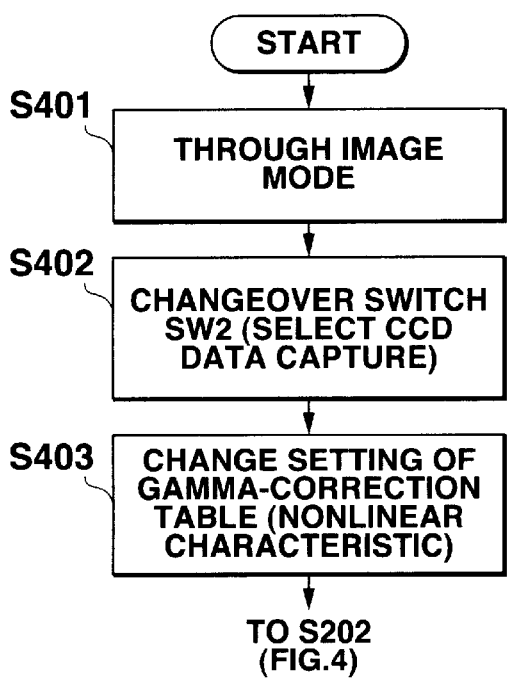
FIGS. 11A and 11B are flowcharts showing a main processing operation of the third embodiment of the camera according to the invention.
Figure 11B:
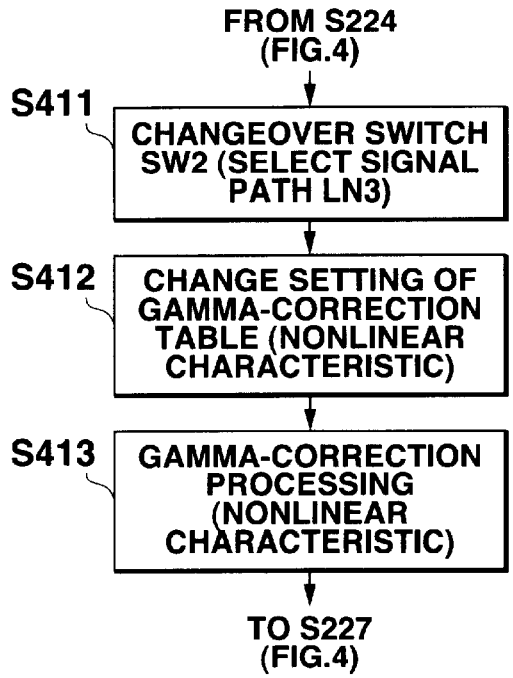

FIG. 10 is a block diagram showing a structure of an essential portion of the third embodiment of the camera according to the invention, and FIGS. 11A and 11B are flowcharts showing a main processing operation of the third embodiment of the camera according to the invention. The same structures and processing operation as those in the above-described embodiment are designated with the same symbols, and explanation thereof will be omitted or simplified.

As shown in FIG. 10, the camera of the present embodiment includes, in addition to the structure of the above-described first embodiment (FIG. 1), a signal path Ln3 for capturing image data from which dark voltage component is cancelled (image data in which DATA2 is subtracted from DATA1) into a γ-correction circuit 21b from the video transfer circuit 23, and a switch SW2 for selectively switching signals to be captured into the γ-correction circuit 21b (CCD output data (DATA1, DATA2) or image data from which the dark voltage component captured through the signal path Ln3 is cancelled).

The switch SW2 is switched and the settings of characteristic of the γ-correction table of the γ-correction circuit 21b is changed by control signals from the CPU 60.

That is, in the normal pick-up mode and through image mode, the switch SW2 is controlled toward a first contact to receive the CCD data, and the γ-correction table of the γ-correction circuit 21b is set such as to have the nonlinear characteristic. In the processing for canceling the dark voltage component of the special effect pick-up mode, the switch SW2 is controlled toward the first contact to receive the CCD data (DATA1, DATA2), and the γ-correction table of the γ-correction circuit 21b is set such as to have the linear characteristic. Further, after the dark voltage component is cancelled, the switch SW2 is controlled toward a second contact to receive the image data from the video transfer circuit 23 through the signal path Ln3, and the γ-correction table of the γ-correction circuit 21b is set such as to have the nonlinear characteristic.

Concrete processing operation in the special effect pick-up mode will be explained with reference to the flowchart in FIGS. 11A and 11B. The flowchart in FIG. 4 is also referred to if necessary.

Through Operation

After a user of the electronic still camera switches a mode switch included in the key input device 50 into a recording mode (REC), if he or she selects the special effect pick-up mode from a menu displayed on the LCD 40, the mechanical shutter 12 is opened, the through image mode is set. At that time, a control signal is output from the CPU 60, and the switch SW2 is controlled toward the first contact to receive the CCD output data (S402), and the γ-correction table of the γ-correction circuit 21b is set so as to have the nonlinear characteristic (S403). In the through image mode, as in the processing operation (S201 to S209) shown in FIG. 4, CCD output data based on a subject image are captured whenever a predetermined exposure time T0 is elapsed, and the data is subjected to the nonlinear γ-correction processing by the γ-correction circuit 21a and the color signal processing by the color process circuit 22, and displayed on the LCD 40 as the through image.

Capture Operation

Next, as in the same manner as the capture operation (S210 to S225) shown in FIG. 4, when a through image having a desired composition is displayed on the LCD 40, if the shutter key provided on the key input device 50 is "halfway pushed" (S210), the CPU 60 detects the start of the recording operation, the γ-correction table of the γ-correction circuit 21b is changed such as to have linear characteristic. Exposure time T1 and focus are set based on information obtained from the pick-up environment of the subject.

Thereafter, as in the same manner as the processing operation in the above-described first embodiment, the CCD output data (DATA1) under a condition where the mechanical shutter 12 is opened and the CCD output data (DATA2) under a condition where the mechanical shutter 12 is closed is captured and is subjected to the linear γ-correction processing by the γ-correction circuit 21b, and it is determined whether the pixel data in the captured CCD output data (DATA2) is white scratch having a predetermined level or higher, and whether the level of the pixel data in the DATA1 corresponding to the pixel data is in saturated state, thereby determining whether the subtraction processing (correction processing for canceling the dark voltage component) should be carried out. The pixel data from which the dark voltage component is cancelled based on the determination whether the subtraction processing should be carried out is temporarily stored in, e.g., the buffer memory 31 through the video transfer circuit 23.

When the above-described correction processing for a frame of all the pixels is completed (Yes in S224 in FIG. 4), as shown in FIG. 11B, a control signal is output from the CPU 60, the switch SW2 is controlled toward the second contact to receive the image data stored in the buffer memory 31 through the signal path Ln3 (S411), and the setting of the γ-correction table of the -correction circuit 21b is changed such as to have the nonlinear characteristic (S412). The image data stored in the buffer memory 31 is captured in the γ-correction circuit 21b through the video transfer circuit 23 and the signal path Ln3, and the nonlinear γ-correction correction processing is carried out by the γ-correction circuit 21b based on the γ-correction table which is set such as to have the nonlinear characteristic in step S412 (S413). Thereafter, as in the same manner as the capture operation (S227 to S230) shown in FIG. 4, the predetermined color signal processing and compression processing such as encoding of JPEG are carried out and then, the data is stored in the flash memory 32 as the captured image. When the pick-up is to be continued, the through image mode is again set, so that the switch SW2 is controlled toward the first contact to receive the CCD output data as shown in FIG. 11A, and the γ-correction table which is set such as to have the nonlinear characteristic.

With the above operation, after the correction processing for canceling the dark voltage component, the image data is again captured in the γ-correction circuit 21b in which the γ-correction table is set to have the nonlinear characteristic, and the nonlinear γ-correction can be carried out. Since it is unnecessary to carry out nonlinear γ-correction using software, it is possible to reduce the load of the CPU 60 for controlling the processing.

In the normal pick-up mode, the same operation processing as that shown in the flowchart in FIG. 3 is carried out, and at the instant when the through image mode is set (S101), a control signal is output from the CPU 60, and the switch SW2 is fixedly controlled toward the first contact to receive the CCD output data and the γ-correction table of the γ-correction circuit 21b is fixedly set to have the nonlinear characteristic, so that the through operation and the capture operation are excellently carried out.

Fourth Embodiment

Next, a fourth embodiment of the camera of the present invention will be explained with reference to the drawings.

Figure 13:
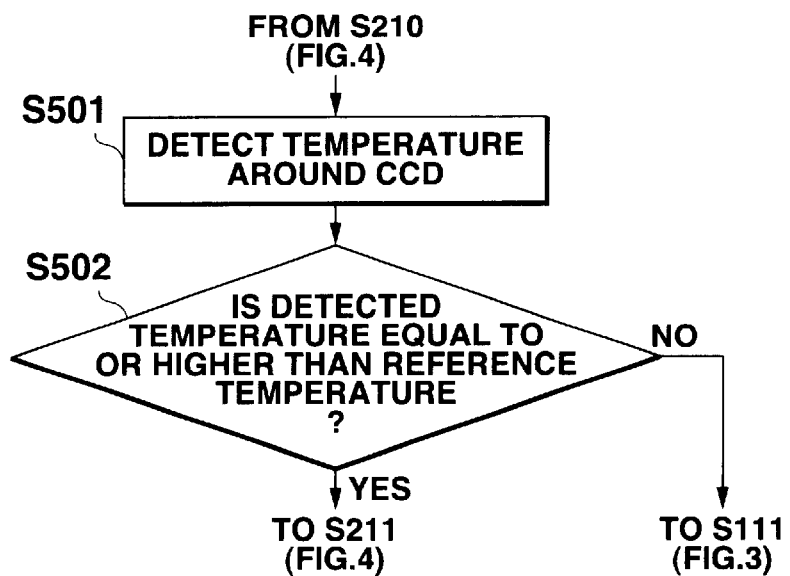
FIG. 13 is a flowchart showing a main processing operation of the fourth embodiment of the camera according to the invention.

FIG. 12 is a block diagram showing a structure of an essential portion of the fourth embodiment of the camera according to the invention, and FIG. 13 is a flowchart showing a main processing operation of the fourth embodiment of the camera according to the invention. The same structures and processing operation as those in the above-described embodiment are designated with the same symbols, and explanation thereof will be omitted or simplified.

As shown in FIG. 12, the camera of the present embodiment includes, in addition to the structure of the above-described first embodiment (FIG. 1), a temperature sensor 80 for detecting temperature around the CCD 13 at the time of image pick-up of a subject or when electric signal (CCD output data) is captured.

The temperature sensor 80 detects an ambient temperature around the CCD 13 and outputs a temperature information to the CPU 60, and the CPU 60 controls whether the correction processing (steps S211 to S225) for canceling the dark voltage component shown in the first embodiment should be carried out based on the detected temperature.

More specifically, the same through operation as that shown in steps S201 to S210 in FIG. 4 is carried out, and if the shutter key is halfway pushed in step S210, the CPU 60 receives the ambient temperature information from the temperature sensor 80 (S501), and the CPU 60 compares the detected temperature with a preset reference temperature (S502). When a temperature raises to such an extent that the dark voltage component is increased, it is determined that the dark voltage component included in the image data affects the CCD output data, the above-described processing (steps S211 to S225) for canceling the dark voltage component is carried out.

On the other hand, if the temperature does not greatly raise so that the affect of the dark voltage component is not great, the above-described correction processing is not carried out, and the capture operation (steps S111 to S116 in FIG. 3) in the normal pick-up mode is carried out.

This embodiment aims to suppress the affect of dependence of temperature of dark voltage in which dark voltage is doubled if a temperature is increased about 8° C. Since it is known that the white scratch also has the similar dependence of temperature, it is possible to avoid the affect of white scratch by this countermeasure. Therefore, since it is possible to selectively perform the correction processing in accordance with the environmental variation (temperature variation), it is possible to reduce the load of the CPU 60 for controlling the processing.

Fifth Embodiment

Next, a fifth embodiment of the camera of the present invention will be explained with reference to the drawings.

Figure 14:
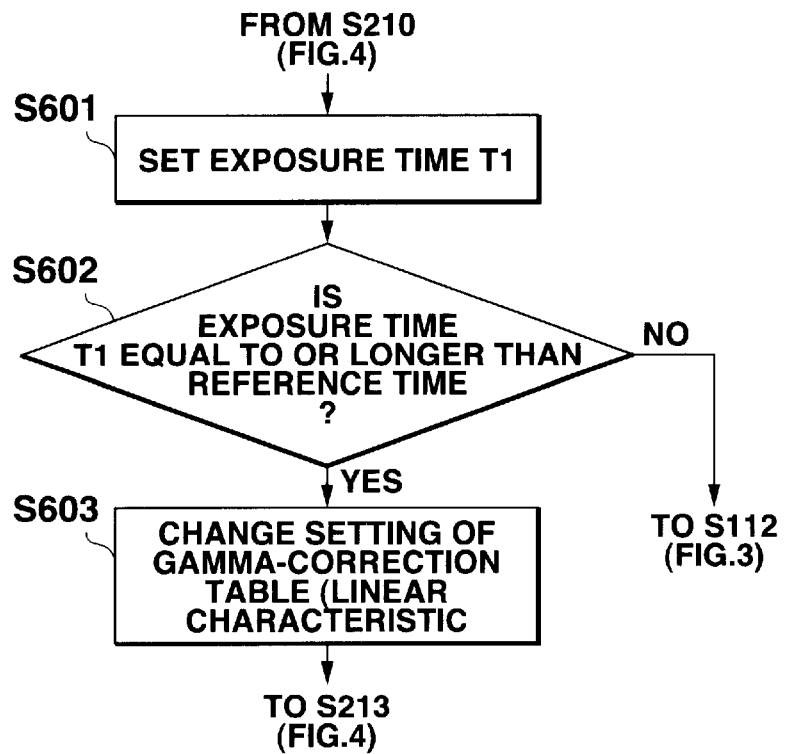
FIG. 14 is a flowchart showing a main processing operation of a fifth embodiment of the camera according to the invention.

FIG. 14 is a flowchart showing a main processing operation of the fifth embodiment of the camera according to the invention. The same structures and processing operation as those in the above-described embodiment are designated with the same symbols, and explanation thereof will be omitted or simplified.

The camera of the present embodiment is characterized in that the CPU 60 is provided with a supervisory function of electric charge accumulating period (accumulating period detecting function) for driving the CCD 13.

The CPU 60 controls whether the above-described correction processing (steps S211 to S225) should be executed based on the charge accumulating period of the CCD 13 at the time of pick-up, i.e., based on the exposure time.

More specifically, as shown in the flowchart in FIG. 14, the exposure time T1 is set in a halfway pushing state of the shutter key in step S210 (S601), and the exposure time T1 and a preset reference time are compared with each other (S602). If it is determined that the exposure time T1 is elongated to such an extent that the dark voltage is increased, it is determined that the affect of the dark voltage component included in the image data is great, setting of the γ-correction table of the γ-correction circuit 21 is changed to have the linear characteristic (S603), the above-described processing (steps S211 to S225) for canceling the dark voltage component is carried out.

On the other hand, if the exposure time is the same as or shorter than the reference value, the correction processing is not carried out, and the capture operation (steps S112 to S121 in FIG. 3) in the normal pick-up mode is carried out.

This embodiment aims to suppress the affect of dependence of temperature of dark voltage in which dark voltage is increased depending on the exposure time. Since it is known that the white scratch also has the similar dependence of the exposure time, it is possible to avoid the affect of white scratch by this countermeasure. Therefore, since it is possible to selectively perform the correction processing in accordance with the environmental variation (exposure time variation), it is possible to reduce the load of the CPU 60 for controlling the processing.

Sixth Embodiment

Next, a sixth embodiment of the camera of the present invention will be explained with reference to the drawings.

Figure 15:
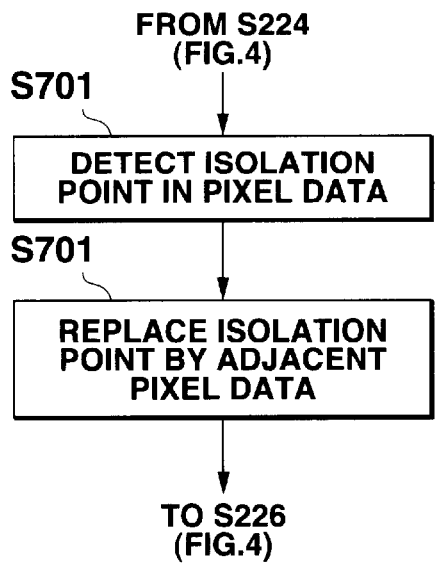
FIG. 15 is a flowchart showing a main processing operation of a sixth embodiment of the camera according to the invention.

FIG. 15 is a flowchart showing a main processing operation of the sixth embodiment of the camera according to the invention. The same structures and processing operation as those in the above-described embodiment are designated with the same symbols, and explanation thereof will be omitted or simplified.

The camera according to the present embodiment is characterized in that in the structure of the above-described embodiment (FIG. 1), the CPU 60 is provided with a function for detecting an isolation point (isolation point detecting function) existing in image data which was subjected to the correction processing (steps S211 to S225 in FIG. 4) shown in the first embodiment.

The CPU 60 detects pixel (isolation point; black scratch when it is bright or white scratch when it is dark) whose data level included in image data which was subjected to the correction processing (steps S211 to S225), and based on the detection result, the pixel data of the isolation point is corrected.

More specifically, from the image data generated after subtraction processing of the DATA1 and DATA2 of steps S221 to S225 in FIG. 4, isolation point in which data level projects from surrounding pixels is detected (S701). Then, the pixel data of the isolation point detected by the CPU 60 is determined as being. erinaceous data, and this data is replaced by adjacent pixel data based on the address of the isolation point (S702). Thereafter, as in the same manner as the capture operation (S226 to S230) shown in FIG. 4, the predetermined color signal processing and compression processing such as encoding of JPEG are carried out and then, the data is stored in the flash memory 32 as the captured image.

With the above operation, image data which is not to be subjected to the correction processing (subtraction processing) for canceling the dark voltage component and which has erinaceous data level, e.g., image data which has pixel data of DATA1 equal to or higher than the predetermined level and which is determined that data level of the DATA1 is in saturated state is also determined as being isolation point and is subjected to the correction processing (replacement processing), and it is possible to appropriately pick-up a subject and store the image.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, each of the embodiments were explained individually, some or all of them may be combined appropriately. In each of the embodiments, the explanation is made based on a case in which as technique of the correction processing for canceling dark voltage component included in the DATA1, under a condition where the γ-correction processing is prohibited by the CPU 60, the CCD output data (DATA2) captured by closing the mechanical shutter 12 is subtracted from the CCD output data (DATA1) of the subject image captured by opening the mechanical shutter 12 by computation processing (subtraction processing) in the CPU 60. However, the present invention should not be limited to this, and other correction processing technique may be applied to the processing method for canceling the dark voltage component such as processing using software or processing using hardware such as a subtractor.

What is claimed is:

1. A camera comprising:
    image pick-up means for outputting image data in accordance with incident light;
    first pick-up control means for obtaining first image data output from the image pick-up means under a condition where an incident light path of the image pick-up means is opened;
    second pick-up control means for obtaining second image data output from the image pick-up means under a condition where the incident light path of the image pick-up means is closed;
    means for correcting the first image data obtained by the first pick-up control means based on the second image data obtained by the second pick-up control means;
    first nonlinear processing means for subjecting the image data output from the image pick-up means to nonlinear processing; and
    means for prohibiting the nonlinear processing for the image data by said first nonlinear processing means when the first and second image data are obtained by the first and second pick-up control means, wherein said first pick-up control means and said second pick-up control means obtain the fist image data and the second image data which are not subjected to the nonlinear processing by said first nonlinear processing means.

2. The camera according to claim 1, wherein said prohibiting means prohibits the nonlinear processing by subjecting the image data output from the image pick-up means to linear processing.

3. The camera according to claim 2, wherein said first nonlinear processing means comprises a first gamma-correction table having nonlinear characteristic and a second gamma-correction table having linear characteristic, carries out the nonlinear processing using the first gamma-correction table, and carries out the linear processing using the second gamma-correction table instead of the first gamma-correction table if the nonlinear processing is prohibited by said prohibiting means.

4. The camera according to claim 1, wherein
    said first nonlinear processing means carries out the nonlinear processing using a gamma-correction circuit, and
    said prohibiting means prohibits the nonlinear processing by allowing the image data output from said image pick-up means to bypass said gamma-correction circuit.

5. The camera according to claim 1, wherein said correcting means corrects the first image data by subtracting the second image data from the first image data.

6. The camera according to claim 1, further comprising second nonlinear processing means for subjecting the first image data corrected by said correcting means to nonlinear processing.

7. The camera according to claim 6, wherein
    said first nonlinear processing means carries out the nonlinear processing using a gamma-correction circuit, and
    said second nonlinear processing means carries out the nonlinear processing for the first image data using said gamma-correction circuit.

8. The camera according to claim 1, further comprising means for storing the first image data which is corrected by said correcting means.

9. The camera according to claim 1, wherein said first pick-up control means is activated in response to a depression of a shutter key switch and said second pick-up control means is activated in response to a completion of first image data-obtaining by said first pick-up control means.

10. The camera according to claim 1, further comprising optical path opening/closing means, and wherein
    said first pick-up control means opens the incident light path leading to said image pick-up means using said optical path opening/closing means, and
    said second pick-up control means closes the incident light path leading to said image pick-up means using said optical path opening/closing means.

11. The camera according to claim 1, further comprising means for setting a special effect mode as an image pick-up mode, and wherein said first and second pick-up control means obtain the first and second image data when the special effect mode is set by said special effect mode setting means.

12. The camera according to claim 1, further comprising third pick-up control means for obtaining third image data which is output from said image pick-up means in a state where the incident optical path leading to said image pick-up means is opened and which is subjected to the nonlinear processing by said first nonlinear processing means.

13. The camera according to claim 12, further comprising means for displaying the third image data obtained by said third pick-up control means.

14. The camera according to claim 13, wherein the third image data obtained by said third pick-up control means is displayed on said displaying means as a finder image.

15. The camera according to claim 12, further comprising means for setting a normal pick-up mode as an image pick-up mode, and wherein said third pick-up control means obtains the third image data when the normal pick-up mode is set by said normal pick-up mode setting means.

16. A camera comprising:
    image pick-up means for outputting image data in accordance with incident light;
    first pick-up control means for obtaining first image data output from the image pick-up means under a condition where an incident light path of the image pick-up means is opened;
    second pick-up control means for obtaining second image data output from the image pick-up means under a condition where the incident light path of the image pick-up means is closed;

means for determining whether a level of the first image data obtained by the first pick-up control means is saturated; and means for correcting the first image data obtained by the first pick-up control means based on a result of determination made by the determining means and based on the second image data obtained by the second pick-up control means.

17. A camera comprising:

an image sensor which outputs image data in accordance with incident light;

first pick-up control means for obtaining first image data output from the image sensor under a condition where an incident light path of the image sensor is opened;

second pick-up control means for obtaining second image data output from the image sensor under a condition where the incident light path of the image sensor is closed;

means for correcting the first image data obtained by the first pick-up control means based on the second image data obtained by the second pick-up control means;

a gamma-correction circuit which non-linearly corrects a gamma characteristic of the image data output from the image sensor; and means for prohibiting the gamma characteristic correction for the image data by said gamma-correction circuit when the first and second image data are obtained by the first and second pick-up control means, wherein said first pick-up control means and said second pick-up control means obtain the fist image data and the second image data which are not subjected to the gamma characteristic correction.

18. A signal processing method for a camera which carries out nonlinear processing for image data output from an image sensor, comprising steps of:

prohibiting the nonlinear processing for the image data output from the image sensor under a condition where an incident light path of the image sensor is opened, thereby obtaining first image data which are not subjected to the nonlinear processing;

step of prohibiting the nonlinear processing for the image data output from the image sensor under a condition where the incident light path of the image sensor is closed, thereby obtaining second image data which are not subjected to the nonlinear processing; and correcting the first image data based on the second image data.

19. A signal processing method for a camera, comprising steps of:

obtaining first image data output from an image sensor under a condition where an incident light path of the image sensor is opened;

obtaining second image data output from an image sensor under a condition where an incident light path of the image sensor is closed;

determining whether a level of the first image data is saturated; and correcting the first image data based on a result of the determination and the second image data.

* * * * *